(12) United States Patent
Lundqvist

(10) Patent No.: US 9,414,132 B2
(45) Date of Patent: Aug. 9, 2016

(54) METHOD AND A FIRST NETWORK NODE OF MANAGING A SCCP CONNECTION

(75) Inventor: Ola Lundqvist, Karlstad (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 1052 days.

(21) Appl. No.: 13/366,883

(22) Filed: Feb. 6, 2012

(65) Prior Publication Data

US 2012/0215897 A1   Aug. 23, 2012

(30) Foreign Application Priority Data

Feb. 22, 2011  (EP) .................................... 11155455

(51) Int. Cl.
G06F 15/177    (2006.01)
G06F 15/173    (2006.01)
G06F 13/00     (2006.01)
H04Q 3/00      (2006.01)
H04L 12/707    (2013.01)

(52) U.S. Cl.
CPC .............. H04Q 3/0025 (2013.01); H04L 45/22 (2013.01)

(58) Field of Classification Search
None
See application file for complete search history.

(56) References Cited

U.S. PATENT DOCUMENTS

| 2003/0169867 | A1  | 9/2003  | Nekrasovskaia et al. |         |
|---|---|---|---|---|
| 2004/0081206 | A1* | 4/2004  | Allison et al. | 370/522 |
| 2004/0264675 | A1* | 12/2004 | Delaney et al. | 379/229 |
| 2007/0157016 | A1* | 7/2007  | Dayan et al. | 713/2 |
| 2007/0220166 | A1* | 9/2007  | Lundstrom | 709/238 |
| 2009/0187575 | A1* | 7/2009  | DaCosta | 707/10 |
| 2011/0053618 | A1* | 3/2011  | Lin et al. | 455/466 |

FOREIGN PATENT DOCUMENTS

EP    1 398 976 A1    3/2004

OTHER PUBLICATIONS

Extended European Search Report corresponding to European Patent Application No. 11155455.6-1246 dated Jun. 20, 2011.

* cited by examiner

*Primary Examiner* — Peter-Anthony Pappas
*Assistant Examiner* — Farrukh Hussain
(74) *Attorney, Agent, or Firm* — Myers Bigel & Sibley, P.A.

(57) ABSTRACT

A method and a first network node for managing a signalling connection control part, "SCCP", are provided. The SCCP connection is associated with a first SCCP identity. The first network node handles a distribution table for distributing a message to a first or a second SCCP instance. The message is provided with the first SCCP identity and is received on the SCCP connection. The first network node configures the distribution table such that the first SCCP identity is associated with the first SCCP instance, thereby allowing the message provided with the first SCCP identity to be received by the first SCCP instance. Then, the first network node reconfigures the distribution table such that the first SCCP identity is associated with the second SCCP instance, thereby managing the SCCP connection such that the message provided with the first SCCP identity is received by the second SCCP instance.

11 Claims, 3 Drawing Sheets

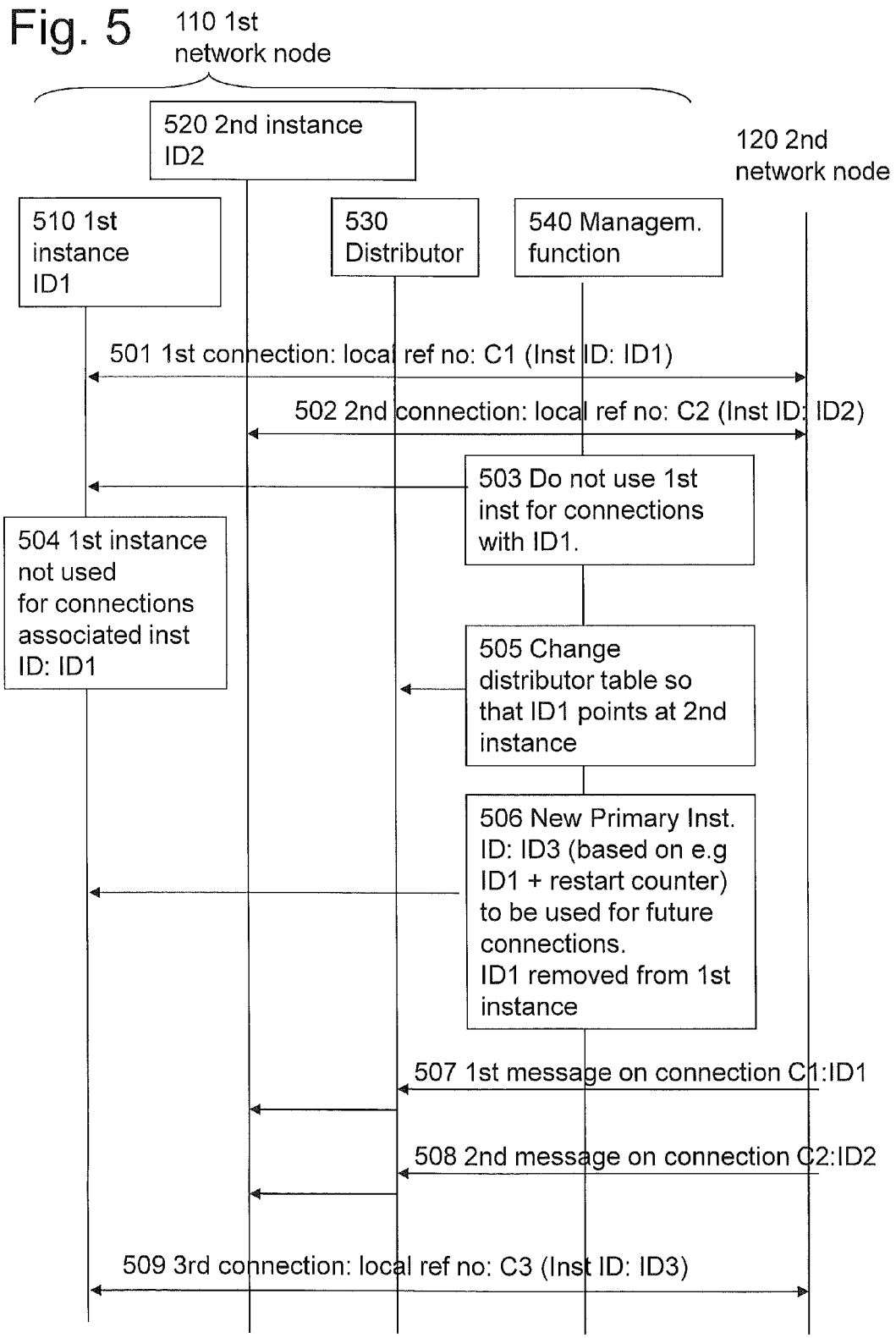

METHOD AND A FIRST NETWORK NODE OF MANAGING A SCCP CONNECTION

CROSS-REFERENCE TO RELATED APPLICATION

The present U.S. non-provisional application claims priority to European Patent Application No. 11155455.6, filed Feb. 22, 2011, the disclosure of which is incorporated herein by reference as if set forth fully herein.

TECHNICAL FIELD

The present disclosure relates to Signalling System No. 7. In particular, the present disclosure relates to method in a first network node and a first network node for managing a signalling connection control part, "SCCP", connection associated with a first SCCP identity.

BACKGROUND

Since communication systems are more and more widely used, demands for reliability are becoming more and more prioritized. Reliability may relate to a risk of failure when a message is delivered to a first network node from a second network node.

Signalling System No. 7 (SS7) is known to be used in for example a Serving General Packet Radio Service Support Node (Serving GPRS Support Node or SGSN) and the like. SS7 supports a distributed SS7 stack, which employs so called horizontal distribution. A protocol within SS7 is a signalling connection control part (SCCP) protocol.

A known SCCP protocol comprises a distribution function, also referred to a distributor function, which distributes a message received from a second network entity to a corresponding SCCP instance. The SCCP instance is identified by a SCCP instance identity. The message is received on a SCCP connection, which is identified by a Local Reference. Furthermore, the SCCP instance holds state information for the SCCP connection, thereby tying the SCCP connection to a particular SCCP instance. Moreover, the SCCP instance identity is encoded in the Local Reference. When the distributor function receives a message on the SCCP connection, it decodes the Local Reference to obtain the SCCP instance identity. Thus, when the SCCP instance identity, has been obtained, the distributor function may forward the message to the SCCP instance identified by the SCCP instance identity.

If the identified SCCP instance is turned off for some reason, such as maintenance or failure, a disadvantage with the known SCCP protocol is that messages on the SCCP connection to the identified SCCP instance may fail. Thus, there is a need for an improved SS7 protocol, which overcomes or at least reduces the above mentioned disadvantage.

SUMMARY

An object of at least some embodiments is to provide a more reliable SCCP connection.

According to an aspect, the object may be achieved by a method in a first network node for managing a signalling connection control part, "SCCP", connection associated with a first SCCP identity. The first network node is capable of handling a first and a second SCCP instance. The first network node handles a distribution table for distributing a message to the first or second SCCP instance. The message is provided with the first SCCP identity and is received on the SCCP connection. The first network node configures the distribution table such that the first SCCP identity is associated with the first SCCP instance. Thereby, the message provided with the first SCCP identity is allowed to be received by the first SCCP instance. Next, the first network node reconfigures the distribution table such that the first SCCP identity is associated with the second SCCP instance. Thereby, the SCCP connection is managed such that the message provided with the first SCCP identity is received by the second SCCP instance.

According to another aspect, the object may be achieved by a first network node for managing a signalling connection control part, "SCCP", connection associated with a first SCCP identity. The first network node is configured to be capable of handling a first and a second SCCP instance. The first network node further is configured to handle a distribution table for distributing a message to the first or second SCCP instance. The message is provided with the first SCCP identity and is received on the SCCP connection. The first network node comprises a processing circuit configured to configure the distribution table such that the first SCCP identity is associated with the first SCCP instance. Thereby, the message provided with the first SCCP identity is allowed to be received by the first SCCP instance. Furthermore, the processing circuit is further configured to reconfigure the distribution table such that the first SCCP identity is associated with the second SCCP instance. Thereby, the SCCP connection is managed such that the message provided with the first SCCP identity is received by the second SCCP instance.

Since the distribution table is reconfigured such that the first SCCP identity is associated with the second SCCP instance, it is made possible for the second SCCP instance to receive messages on a SCCP connection associated with the first SCCP identity. These messages would otherwise be forwarded to the first SCCP instance. If the first SCCP instance is put out of operation, those messages would fail. However, as disclosed herein, these messages are forwarded to the second SCCP instance, where the messages will be successfully received. Expressed differently, the SCCP connection to the first SCCP instance is moved to a second SCCP instance, when it is not desired to use the first SCCP instance. In this manner, the SCCP connection and a message on the SCCP connection are successfully transmitted, i.e. the message and the SCCP connection are not lost. As a result, the SCCP connection is made more reliable.

A possible advantage of embodiments is that the SCCP connection remains usable, even when instances are turned off for some reason. That is a message on the SCCP connection will more likely reach a SCCP instance for handling of the message.

A further possible advantage is that embodiments disclosed herein are implemented in the first network node, i.e. no modification of a remote unit configured to send a message on a SCCP connection is required.

BRIEF DESCRIPTION OF THE DRAWINGS

The various aspects of embodiments disclosed herein, including particular features and advantages thereof, will be readily understood from the following detailed description and the accompanying drawings, in which:

FIG. 5 shows a schematic, combined signalling and flow chart of another exemplifying method in the communication system according to FIG. 1.

DETAILED DESCRIPTION

Figure 1:
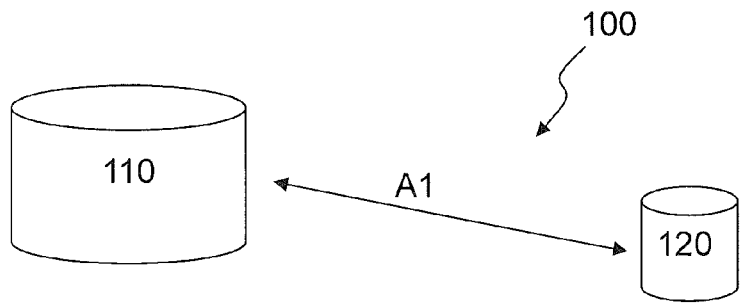
FIG. 1 shows a schematic overview of an exemplifying communication system in which an exemplifying method according embodiments herein may be implemented.

Throughout the following description similar reference numerals have been used to denote similar network nodes, elements, parts, items or features, when applicable. In the Figures, features that appear in some embodiments are indicated by dashed lines.

FIG. 1 shows a schematic overview of an exemplifying communication system 100 in which an exemplifying method according embodiments herein may be implemented. The communication system 100 may be a telecommunication system, such as a Wideband Code Division Multiple Access (WCDMA). The communication system 100 comprises a first network node 110 and a second network node 120. The first network node 110 may be a Media Gateway (MGW), a radio network controller (RNC), base station controller (BSC), a Serving GPRS Support Node (SGSN) or a Home Location Register (HLR) system or the like. The second network node 120 may be a remote unit, such as a Media Gateway (MGW), a radio network controller (RNC), base station controller (BSC), a Serving GPRS Support Node (SGSN) or a Home Location Register (HLR) system or the like. An arrow A1 indicates that the first and second network node 110, 120 may communicate with each other.

Figure 2:
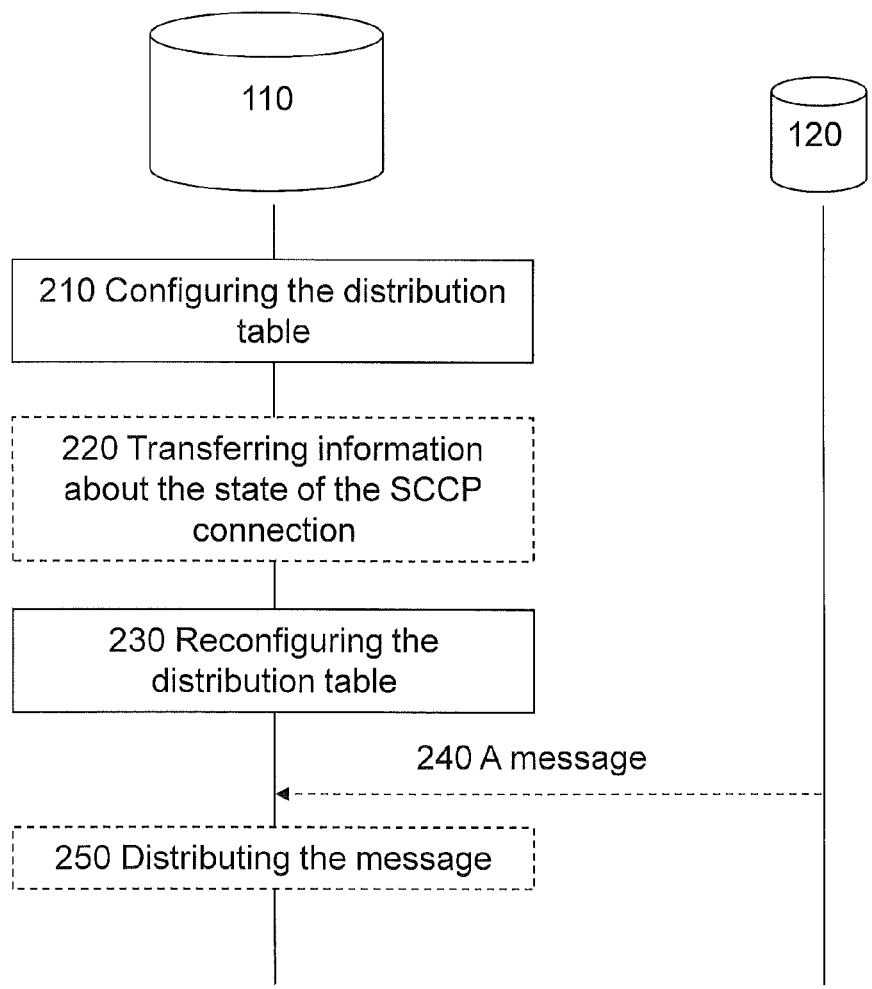
FIG. 2 shows a schematic, combined signalling and flow chart of an exemplifying method in the communication system according to FIG. 1.

Now turning to FIG. 2, there is shown a schematic, combined signalling and flow chart of an exemplifying .method in the communication system according to FIG. 1. The exemplifying method is performed to manage a SCCP connection associated with a first SCCP identity, or a first SCCP instance identity or a first SCCP identifier. The first network node 110 is capable of handling a first and a second SCCP instance. The first network node 110 handles a distribution table for distributing a message to the first or second SCCP instance. The message may be provided with the first SCCP identity and may be received on the SCCP connection. As an example, the message may be sent on the SCCP connection having a specific local reference. From the specific local reference the first SCCP identity may be derived, for examples, as a value of bits of the specific local reference.

In some embodiments, a management module, or management function, may be executing in the first network node 110.

In some embodiments, a distribution module, or distributor function, may be executing in the first network node 110.

The following actions, such as steps, may be performed. Notably, in some embodiments of the method the order of the actions may differ from what is indicated below.

Action 210

The first network node 110 configures the distribution table such that the first SCCP identity is associated with the first SCCP instance, thereby allowing the message provided with the first SCCP identity to be received by the first SCCP instance. As an example, the first SCCP identity is linked to the first SCCP instance in that the first SCCP instance may be identified by means of the first SCCP identity. When the first SCCP instance is identified it may mean that a reference to the first SCCP instance is obtained. As an example, the reference may be a pointer to the first SCCP instance or some other identifier used internally within the first network node 110.

In some embodiments, action 210 may be performed by the management module executing in the first network node 110.

Action 220

In some embodiments, the first network node 110 transfers information about the state of the SCCP connection to the second SCCP instance. In this manner, the second SCCP instance is informed about the state of the SCCP connection that is to be moved from the first SCCP instance to the second SCCP instance.

Action 230

The first network node 110 reconfigures the distribution table such that the first SCCP identity is associated with the second SCCP instance. Thereby, the first network node 110 manages the SCCP connection such that the message provided with the first SCCP identity is received by the second SCCP instance.

In some embodiments, the distribution table comprises a plurality of posts. Each post comprises a reference to a SCCP instance. As an example, each post may have an index indicating a respective SCCP identity.

In some embodiments, the reconfiguring is performed by changing a post, having an index indicated by the first SCCP identity, to comprise a reference to the second SCCP instance. As an example, the post, which is changed, may be one of the plurality of posts comprised in the distribution table.

In some embodiments, action 230 may be performed by the management module executing in the first network node 110.

Action 240

In some embodiments, the first network node 110 receives, from the second network node 120, the message being provided with the first SCCP identity.

In some embodiments, action 240 may be performed by the distribution module executing in the first network node 110.

Action 250

The first network node 110 distributes the message to the second SCCP instance by using the reconfigured distribution table in which the first SCCP identity is associated with the second SCCP instance. In this manner, messages addressed to the first identity are still successfully transmitted even though the first identity no longer is associated with the first SCCP instance.

In some embodiments, action 250 may be performed by the distribution module executing in the first network node 110.

Figure 3:
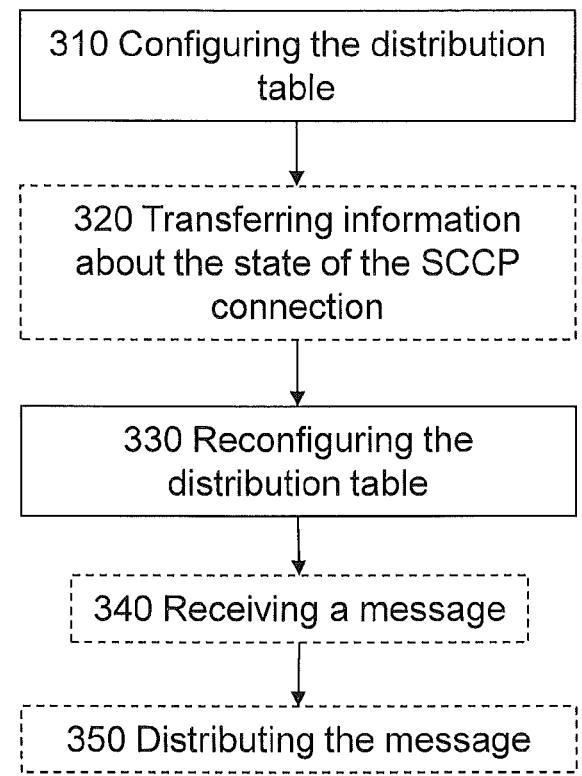
FIG. 3 shows a schematic flow chart of the method of FIG. 2 when seen from the first network node.

In FIG. 3, there is shown an exemplifying, schematic flow chart of the method of FIG. 2 when seen from the first network node 110. The first network node 110 performs a method for managing a SCCP connection associated with a first SCCP identity. As mentioned above, the first network node 110 is capable of handling a first and a second SCCP instance. Also as mentioned above, the first network node 110 handles a distribution table for distributing a message to the first or second SCCP instance. Again, the message may be provided with the first SCCP identity and may be received on the SCCP connection.

The following actions, such as steps, may be performed. Notably, in some embodiments of the method the order of the actions may differ from what is indicated below.

Action 310

Action 310 is similar to action 210. The first network node 110 configures the distribution table such that the first SCCP identity is associated with the first SCCP instance, thereby allowing the message provided with the first SCCP identity to be received by the first SCCP instance.

Action 320

Action 320 is similar to action 220. In some embodiments of the method in the first network node 110, the first network node 110 transfers information about the state of the SCCP connection to the second SCCP instance.

Action 330

Action 330 is similar to action 230. The first network node 110 reconfigures the distribution table such that the first SCCP identity is associated with the second SCCP instance. Thereby, the first network node 110 manages the SCCP connection such that the message provided with the first SCCP identity is received by the second SCCP instance.

In some embodiments of the method in the first network node 110, the distribution table comprises a plurality of posts. Each post may comprise a reference to a SCCP instance and an index the post may indicate a respective SCCP identities.

In some embodiments of the method in the first network node 110, the reconfiguring is performed by changing a post, having an index indicated by the first SCCP identity, to comprise a reference to the second SCCP instance.

Action 340

Action 340 is similar to action 240. In some embodiments of the method in the first network node 110, the first network node 110 receives, from the second network node 120, the message being provided with the first SCCP identity.

Action 350

Action 350 is similar to action 250. The first network node 110 distributes the message to the second SCCP instance by using the reconfigured distribution table in which the first SCCP identity is associated with the second SCCP instance. In this manner, messages addressed to the first identity are still successfully transmitted even though the first identity no longer is associated with the first SCCP instance.

Figure 4:
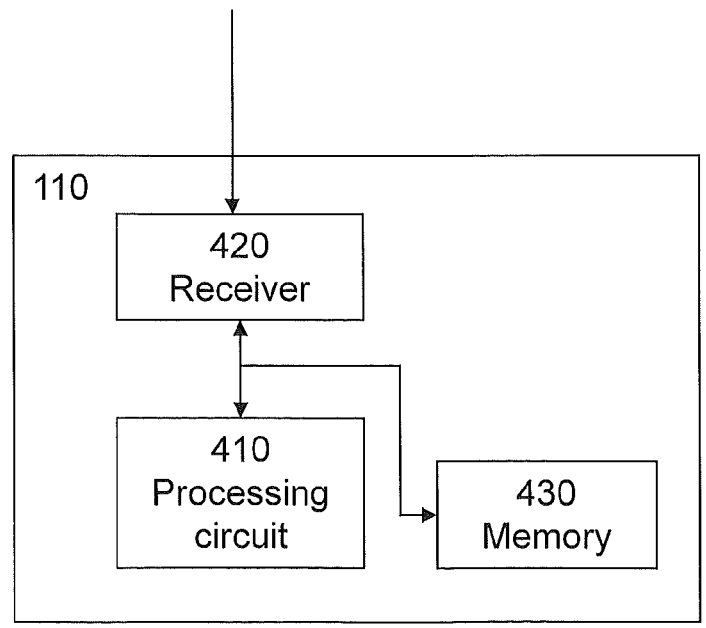
FIG. 4 shows a schematic block diagram of an exemplifying first network node configured to perform the method illustrated in FIG. 3.

With reference to FIG. 4, there is shown a schematic block diagram of the first network node 110 of FIG. 1 configured to perform the actions above for managing a SCCP connection. FIG. 4 shows a first network node 110 for managing a signalling connection control part, "SCCP", connection associated with a first SCCP identity. As mentioned above, the first network node 110 is configured to be capable of handling a first and a second SCCP instance. Yet again, the first network node 110 further is configured to handle a distribution table for distributing a message to the first or second SCCP instance, the message being provided with the first SCCP identity and being received on the SCCP connection.

The first network node 110 comprises a processing circuit 410 configured to configure the distribution table such that the first SCCP identity is associated with the first SCCP instance, thereby allowing the message provided with the first SCCP identity to be received by the first SCCP instance. The processing circuit 410 further is configured to reconfigure the distribution table such that the first SCCP identity is associated with the second SCCP instance, thereby managing the SCCP connection such that the message provided with the first SCCP identity is received by the second SCCP instance.

In some embodiments of the first network node 110, the processing circuit 410 further is configured to transfer information about the state of the SCCP connection to the second SCCP instance.

In some embodiments of the first network node 110, the processing circuit 410 further is configured to distribute the message to the second SCCP instance by using the reconfigured distribution table in which the first SCCP identity is associated with the second SCCP instance.

The processing circuit 410 may be a processing unit, a processor, an application specific integrated circuit (ASIC), a field-programmable gate array (FPGA) or the like. As an example, a processor, an ASIC, an FPGA or the like may comprise one or more processor kernels.

In some embodiments of the first network node 110, the processing circuit may include the management module and/or the distribution module mentioned above.

In some embodiments of the first network node 110, the first network node 110 may further comprise a receiver 420 configured to receive, from the second network node 120, the message being provided with the first SCCP identity.

In some embodiments of the first network node 110, the first network node 110 may further comprise a memory 430 for storing software to be executed by, for example, the processing circuit. The software may comprise instructions to enable the processing circuit to perform the method in the first network node 110 as described above in conjunction with FIG. 3. The memory 430 may be a hard disk, a magnetic storage medium, a portable computer diskette or disc, Flash memory, random access memory (RAM) or the like. Furthermore, the memory may be an internal register memory of a processor.

In some embodiments of the first network node 110, the distribution table comprises a plurality of posts. Each post may comprise a reference to a SCCP instance and an index of the post may indicate a respective SCCP identities.

In some embodiments of the first network node 110, the reconfiguring is performed by changing a post, having an index indicated by the first SCCP identity, to comprise a reference to the second SCCP instance.

With reference to FIG. 5, there is shown a schematic, combined signalling and flow chart of another exemplifying method in the communication system according to FIG. 1. The first network node 110, often referred to as local side, may comprise a first and a second SCCP instance 510, 520, a distributor function 530 and a management function 540. The second network node 120 may be a remote unit.

In this example, the first SCCP instance 510 may hold a primary SCCP instance identity, such as a first SCCP instance identity ID1. Moreover, the second SCCP instance 520 may hold a primary SCCP instance identity, such as a second SCCP instance identity ID2, and it may also hold a secondary SCCP instance identity, such as the first SCCP instance identity ID1. The second SCCP instance 520 may accept to handle SCCP connection tied to the primary and secondary SCCP instance identities. The first SCCP instance 510 may also hold a secondary SCCP instance identity, but this is not required for the example below.

Moreover, the management function 540 is configured to send instructions to the distributor function 530 for configuration of a table, or a distribution table, handled by the distributor function 530.

The following actions, such as steps, may be performed. Notably, in some embodiments of the method the order of the actions may differ from what is indicated below.

Action 501

A first connection with a first local reference C1, including a first SCCP instance identity ID1, is established between the first network node 110 and the second network node 120. The first SCCP instance identity is associated with a first SCCP instance 510. The management function 540 may be a software or hardware module of the first network node 110 of FIG. 1. As an example, the processing circuit 410 of FIG. 4 may include the management function 540. It may be noted that the first connection is tied to the primary SCCP instance identity of the first SCCP instance 510.

Action 502

A second connection with a second local reference C2, including a second SCCP instance identity ID2, is established between the first network node 110 and the second network node 120. The second SCCP instance identity is associated with a second SCCP instance 520.

Action 503

The management function obtains an indication of that the first SCCP instance 510 is to be put out of operation for the first connection C1. This may be caused by a failure, maintenance, load restriction on the first SCCP instance 510 or the like.

Action 504

The first SCCP instance 110 is restarted or maintenance is performed.

Action 505

The management function 540 changes, or reconfigures, the distribution table such that the first SCCP instance identity ID1 points at the second SCCP instance. As an example, the distributor function 530 receives configuration information, such as a SCCP instance identity and a reference to a SCCP instance to handle messages on a connection, whose local reference indicates the SCCP instance identity. The configuration information may be used by the distributor function to configure a table for handling SCCP instance identities and references to SCCP instances. The distributor function 530 may be a software or hardware module of the first network node 110 of FIG. 1. As an example, the processing circuit 410 of FIG. 4 may include the distributor function 530.

Action 506

The management function 540 assigns a new primary SCCP instance identity ID3 to the first SCCP instance when it has been restarted. The first SCCP instance identity is removed from the first SCCP instance.

Action 507

A first message from the second network node 120 is received, on the first connection C1, by the distributor function 530, which decodes the first local reference C1 to obtain the first SCCP instance identity ID1. Next, the distributor function forwards the first message to the second SCCP instance 520, which holds the first SCCP instance identity ID1 as a secondary SCCP instance identity. The distributor function may use the distribution table to find a reference to the second SCCP instance which corresponds to the first SCCP instance identity.

Action 508

A second message from the second network node 120 is received, on the second connection C2, by the distributor function 530, which decodes the second local reference C2 to obtain the first SCCP instance identity ID1. Next, the distributor function forwards the second message to the second SCCP instance 520, which holds the first SCCP instance identity ID1 as a secondary SCCP instance identity.

Action 509

A third connection with a third local reference C3, including a third SCCP instance identity ID3, is established between the first network node 110 and the second network node 120. The third SCCP instance identity is associated with the first SCCP instance 510.

Even though embodiments of the various aspects have been described, many different alterations, modifications and the like thereof will become apparent for those skilled in the art. The described embodiments are therefore not intended to limit the scope of the present disclosure.

The invention claimed is:

1. A method in a first network node for managing a signalling connection control part, "SCCP", connection associated with a first SCCP identity, wherein the first network node is capable of handling a first and a second SCCP instance, wherein the first network node handles a distribution table for distributing a first message and a second message, the first and second messages being provided with the first SCCP identity and being received on the SCCP connection, wherein the method comprises:
    configuring the distribution table to a first configuration wherein the first SCCP identity is associated with the first SCCP instance, and wherein the first message provided with the first SCCP identity is distributed by the first network node to the first SCCP instance;
    obtaining an indication that the first SCCP instance is to be put out of operation for the connection associated with the first SCCP identity; and
    responsive to the obtaining an indication, reconfiguring the distribution table to a second configuration wherein the first SCCP identity is associated with the second SCCP instance, and wherein the SCCP connection associated with the first SCCP identity is managed wherein the second message provided with the first SCCP identity is distributed by the first network node to the second SCCP instance,
    wherein the first message comprises a specific local reference comprising a value of bits from which the first SCCP identity may be derived.

2. The method in the first network node according to claim 1, further comprising:
    receiving, from a second network node, the second message being provided with the first SCCP identity;
    distributing the second message to the second SCCP instance by using the reconfigured distribution table in which the first SCCP identity is associated with the second SCCP instance.

3. The method in the first network node according to claim 1, further comprising:
    responsive to the obtaining an indication, transferring information about a state of the SCCP connection associated with the first SCCP identity to the second SCCP instance.

4. The method in the first network node according to claim 1, wherein the distribution table comprises a plurality of posts, wherein each post comprises a reference to a SCCP instance and wherein indices of the plurality of posts indicate SCCP identities.

5. The method in the first network node according to claim 4, wherein the reconfiguring the distribution table further comprises changing a post, having an index indicated by the first SCCP identity, to comprise a reference to the second SCCP instance.

6. The method in the first network node according to claim 1, wherein the first network node is a Media Gateway (MGW), a radio network controller (RNC), base station controller (BSC), a Serving General Packet Radio Service Support Node (Serving CPRS Support Node or SGSN) or a Home Location Register (HLR).

7. A first network node for managing a signalling connection control part, "SCCP", connection associated with a first SCCP identity, wherein the first network node is configured to be capable of handling a first and a second SCCP instance, wherein the first network node further is configured to handle a distribution table for distributing a first message and a second message, the first and second messages being provided with the first SCCP identity and being received on the SCCP connection, wherein the first network node comprises:
    a processing circuit that:
    configures the distribution table to a first configuration wherein the first SCCP identity is associated with the first SCCP instance, and wherein the first message provided with the first SCCP identity is distributed by the first network node to the first SCCP instance;

obtains an indication that the first SCCP instance is to be put out of operation for the connection associated with the first SCCP identity; and responsive to the obtaining an indication, reconfigures the distribution table to a second configuration wherein the first SCCP identity is associated with the second SCCP instance, and wherein the SCCP connection associated with the first SCCP identity is managed wherein the second message provided with the first SCCP identity is distributed by the first network node to the second SCCP instance, wherein the first message comprises a specific local reference comprising value of bits from which the first SCCP identity may be derived.

8. The first network node according to claim 7, wherein the processing circuit is further configured to, responsive to the indication, transfer information about a state of the SCCP connection associated with the first SCCP identity to the second SCCP instance.

9. The first network node of claim 7, wherein the processing circuit configures the distribution table to comprise a plurality of posts, wherein each post comprises a reference to a SCCP instance and wherein indices of the plurality of posts indicate SCCP identities.

10. The first network node of claim 9, wherein the processing circuit reconfigures the distribution table by changing a post, having an index indicated by the first SCCP identity, to comprise a reference to the second SCCP instance.

11. The first network node of claim 7, further comprising circuitry configured to provide a Media Gateway (MGW), a radio network controller (RNC), base station controller (BSC), a Serving General Packet Radio Service Support Node (Serving GPRS Support Node or SGSN) or a Home Location Register (HLR).

* * * * *